United States Patent Office 3,532,398
Patented Oct. 6, 1970

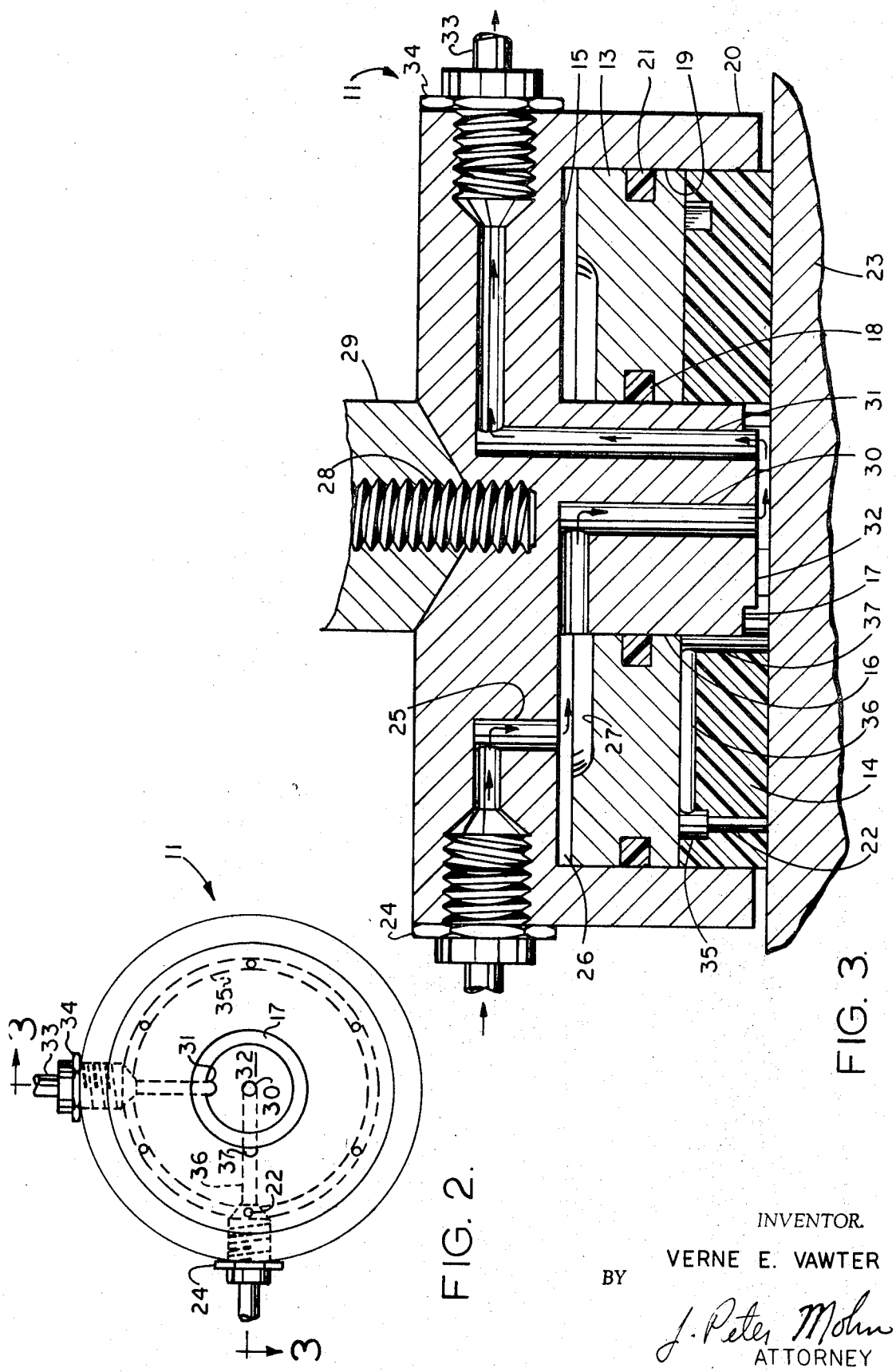

3,532,398
SELF-ADJUSTING BEARING
Verne E. Vawter, Bonita, Calif., assignor to Rohr Corporation, Chula Vista, Calif., a corporation of California
Filed Sept. 11, 1968, Ser. No. 759,085
Int. Cl. F01b *31/10;* F16c *5/00*
U.S. Cl. 308—3                                          10 Claims

ABSTRACT OF THE DISCLOSURE

A self-compensating low-friction bearing for supporting heavy loads in sliding relationship to flat surfaces is disclosed. The actual bearing surface is a low friction material such as Teflon. A hydraulic control arrangement automatically compensates for wear of the bearing surface by sensing the distance between the way and the bearing housing and adjusting the bearing surface accordingly.

BACKGROUND OF THE INVENTION

This invention relates to sliding type bearings and more particularly to slide-way bearings of the type used to slidably support a heavy machine table upon supporting ways.

In many applications in the machinery and manufacturing arts, among others, bearings are needed which are capable of slidably supporting heavy loads on flat surfaces. A typical application for such bearings is, by way of example, the support of a milling machine work-holding table or carriage on the horizontal ways of the machine. The bearing of such machines must support substantial loads since the machine themselves and the workpieces they hold are extremely large and heavy. Another application for such heavy duty bearings is to slidingly support the massive tracking antennas, presently appearing in greater numbers, upon their supporting ways. Various bearings are available in the prior art for such applications but each suffers from at least one of numerous disadvantages. The simplest of those available is essentially a flat sliding-surface arrangement. Materials may be chosen to minimize friction and wear in such flat arrangements but they usually exhibit relatively excessive wear characteristics. They furthermore exhibit undesirable friction characteristics in that starting or static friction is normally substantially higher than friction during sliding motion. Such characteristics are detrimental to smooth motion. When the two adjacent sliding surfaces are hardened steel or cast iron, costly surface finishing is necessary to smooth and true same. The surfaces so finished are quite vulnerable to dirt contamination, to further complicate matters.

Roller type bearings may also be used, however because of the relatively small contact area of such bearings, surface loads per unit area are very high. The surfaces of the ways accordingly have to be hardened to withstand such loads. Hardened ways add a substantial expense to the overall machine and are consequently undesirable. Furthermore such bearings exhibit such a low order of friction that expensive dampening systems must be provided to achieve stability in the servo systems which normally drive the work tables or carriages.

A third bearing is the hydrostatic type in which all of the load is supported on a hydraulic (oil) film. Wear and hardening requirements are obviated in such latter bearings however the hydraulic supply needed to provide sufficient hydraulic pressure is extensive and accordingly costly. Furthermore, as in the roller bearing, friction is so low that a dampening system is required.

In view of the various shortcomings of the prior art it should be apparent that a need exists for an improved bearing which obviates such shortcomings while retaining some of the desirable features of the prior art.

SUMMARY OF THE INVENTION

Accordingly, an object of this invention is to provide an improved bearing.

Another object of this invention is to provide a low friction bearing.

A further object of this invention is to provide a low friction bearing for slidably supporting a heavy load on a way.

A yet further object of this invention is to provide a low friction bearing which automatically compensates itself for wear.

In accordance with this invention the above objects are achieved by a new and novel bearing structure including a cylindrical housing having an open end, a closed end, a side wall and a raised center portion. The raised center portion extends to a plane in line with the open end of the cylinder. Inside the cylinder and about the raised center portion, a washer-shaped piston is disposed. The piston is in sealing relationship to the cylinder side wall and the raised center portion. A chamber is therefor formed between the cylinder closed end and the piston. Hydraulic pressure is supplied to the chamber so formed. A washer-shaped pad of low friction material is attached in abutting relationship to the piston, the pad in turn extending slightly from the housing to form the sliding surface of the bearing. Means are then provided to regulate the chamber hydraulic pressure in accordance with the spacing between the cylinder raised portion and the way upon which the bearing is to slide.

The above and other objects and features of this invention will be better understood from the ensuing detailed description and appended claims considered in conjunction with the attached drawings wherein:

FIG. 2 is a bottom plan view of the bearing of FIG. 1 in assembled condition; and FIG. 3 is a cross-sectional view of the bearing taken along line 3—3 of FIG. 2.

DETAILED DESCRIPTION

Figure 1:
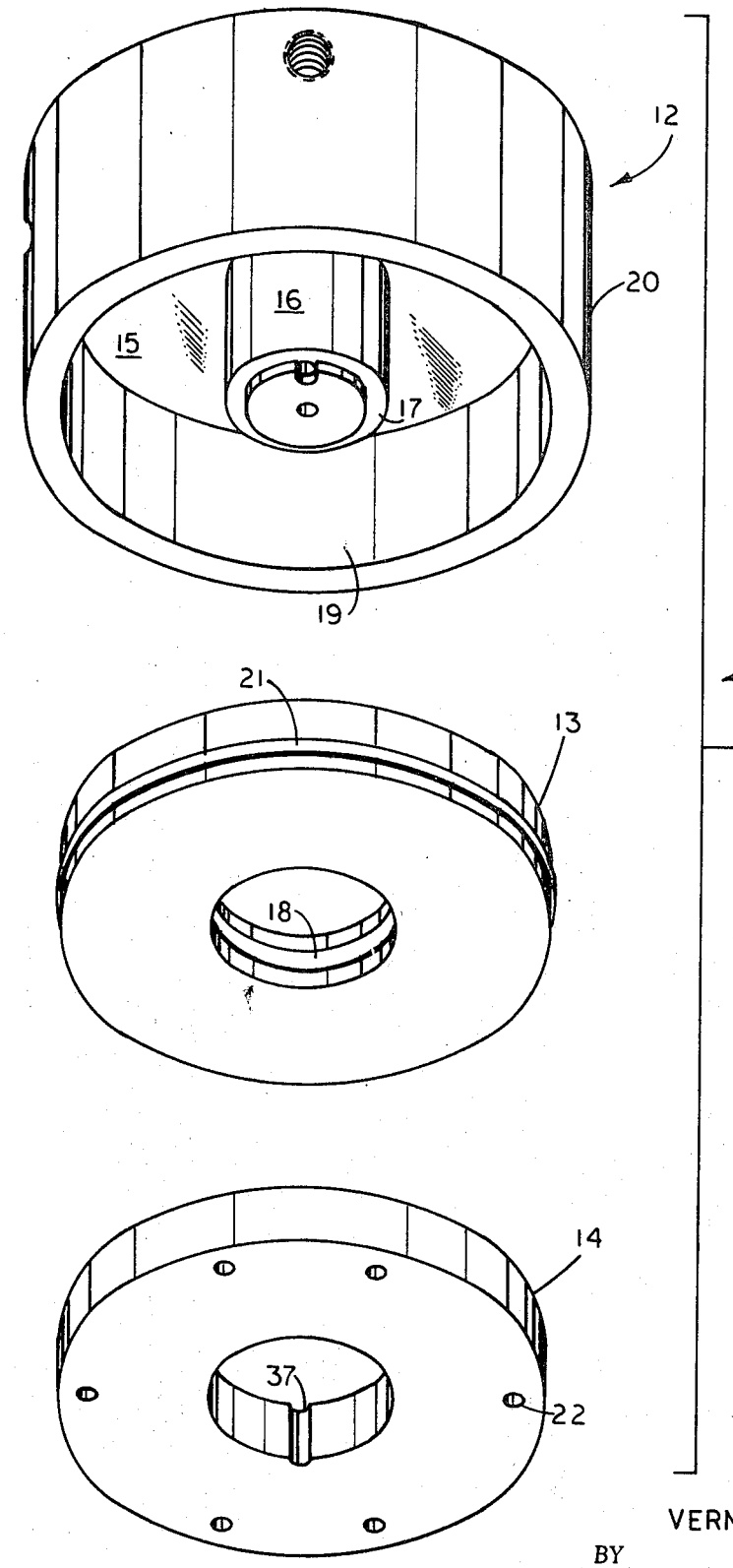
FIG. 1 is an exploded isometric view of one embodiment of this invention.

Referring now to FIG. 1, the general arrangement of one embodiment of the invention may be readily understood. The bearing assembly generally designated by numeral 11 comprises a cylindrical housing generally designated 12, a washer-shaped piston 13 and a washer-shaped pad 14 of low friction material attached in abutting relation thereon. Housing 12 is closed at one end by an end wall 15 but open at its other end. A raised portion 16 is centrally located within housing 12 and extends from end wall 15, along the central axis of the cylinder, to a plane extending across the open end of same. Around the perimeter of the center portion 16, a notch or ledge 17 may be provided for reasons which will be more apparent from the discussion relating to FIGS. 2 and 3. Raised center portion 16 is rigidly secured to end wall 15 and in fact may be machined out of a one-piece housing member as in the preferred embodiment. The diameter of the center portion 16 is so sized as to sealingly mate with the inner diameter of piston 13. To enhance the sealing between the latter two members, piston 13 is provided with an O ring 18 retained in a groove extending about its inner perimeter. The outer diameter of piston 13 is so sized as to sealingly mate with the inner surface 19 cylindrical housing wall 20. An O ring 21 extends, in a groove, about the outer perimeter of piston 13 to enhance the seal between same and the side wall 19.

Pad 14, which makes contact with the way upon which the bearing is to slide may be constructed of numerous low friction materials. In the preferred embodiment, the pad 14 is made of tetrafluoroethylene fluorocarbon resins as sold by E. I. DuPont de Nemours and Company under the trademark "Teflon." The particular material chosen for the pad is determined by the frictional characteristics desired. In some applications where a feedback-controlled servo system is involved, such as in a numerical controlled machine, sufficient friction is needed to provide the required degree of dampening to the system.

As shown in FIG. 1, pad 14 may contain a plurality of holes such as 22 peripherally disposed about it. Although such holes are not necessary for operation of the invention they may be provided if lubricant flow to the pad surface is desired. The details of such lubrication will be better understood from the discussion of FIG. 3 to follow.

The outside diameter of pad 14 should be substantially the same as that of the piston to provide the greatest bearing surface. Similarly, the diameter of the center cutout of the pad should be substantially the same as that of the piston so that it clears the raised portion 16 when the device is assembled.

Referring now to FIGS. 2 and 3, the operation of the bearing of this invention will be better understood. FIG. 3 is a sectional view of the assembled bearing 11 in an operating position upon a way 23 or other solid surface upon which a load is to be slidingly supported. Piston 13 is therefore disposed within the housing 12 in sealing relationship to wall 19 and raised portion 16. Abutting the cylinder is the pad 14 of low-friction material which comprises the main surface of the bearing. Hydraulic pressure is supplied to the assembly through inlet fitting 24 and thence through passageway 25 to the chamber 26 formed between housing end wall 15 and the adjacent side of piston 13. The surface 27 of piston 13 may be dished out as shown in FIG. 3 for best operation of the device.

The hydraulic pressure in chamber 26 applies a force to piston 13 which tends to move it towards way 23. The force actually exerted on the piston is dependent on the pressure within the chamber. This latter condition is true since pressure equals force per unit area and when the area is constant it follows that force is proportional to pressure.

In the instant device it is desired to exert a force on piston 13 and ultimately on pad 14 sufficient to support the load a fixed distance from way 23. Means are therefor provided for regulating the hydraulic pressure in proportion to the distance of the housing 12 from the way 23 and hence the distance of the load from the way. It can be noted that in FIG. 3 a load has not been shown as such. A threaded shaft 28 and member 29 however are intended to represent the structural extremities of a load which might be supported by a bearing of this invention. It is sufficient for understanding this invention to state that suitable means are provided for attaching the bearing to the load which is to be supported.

Considering now the pressure-regulating means it should be noted that although the arrows show the flow of hydraulic fluid through one side of chamber 26, such flow would in fact exist throughout the chamber.

The regulating means essentially comprises passageways 30 and 31 and the space formed between the end 32 of the raised center portion 16 and the surface of way 23. Passageway or bore 30 connects chamber 26 with the end 32 of center portion 16 while passageway or bore 31 connects the end 32 with the hydraulic supply return line 33 through fitting 34. The distance between end surface 32 and way 23 determines the resistance to hydraulic flow through that area and hence the bleed rate of fluid from the inlet to the outlet. As the noted distance and consequently the bleed rate is increased, a pressure drop occurs in the chamber 26 resulting in a lowering of hydraulic force and hence a lowering of the bearing assembly with respect to the way 23. When the distance is decreased and the resistance to flow consequently increased, as would happen when the noted lowering occurred, the pressure in chamber 26 is increased with a resultant increase in hydraulic force against piston 13. With increased force it follows that the bearing assembly begins to rise in relation to the way 23. An equilibrium condition exists between the low and high pressure extremes noted with the resultant establishment of a constant distance between the assembly and the way. The particular distance which will exist at equilibrium is a function of the area of the inner face of the piston 13 and the weight of the load applied. Consequently, each bearing assembly should be tailored to its particular application.

Ideally, all hydraulic fluid leaving the bearing should pass through outlet line 33. As a practical consideration however, a quantity of such fluid tends to leak from the system and escape between the surface of pad 14 and way 23. Such fluid loss as the latter tends to improve the bearing operation by further lubricating the bearing pad. If such pad lubrication is insufficient, holes 22, peripheral channel 35, radial channel 36 and passageway 37 may be provided in pad 14. Passageway 37 communicates with the lubricating fluid in the space between surface 32 and way 23 and permits such fluid to pass through radial channel 35 to peripheral channel 36 and thence through holes 22 to the pad/way interface.

It should be noted that in actuality the central area of the bearing assembly of this invention is a hydrostatic type of bearing. The remainder of the supporting surface is a sliding-surface-type bearing, however, the unique combination of the two types of bearings in one assembly helps to make this invention as efficient as it is.

It may be further noted that although a hydraulic system is needed for the bearing of this invention to operate, the extent of such a system is minimal compared to those needed with the totally hydrostatic bearings. In one embodiment consrtucted in accordance with this invention, a hydraulic system of the size normally used for lubrication purposes only supplied sufficient pressure to operate the bearing.

The particularly unique feature of this invention resides in the fact that as the surface of pad 14 wears, the device automatically compensates for such wear since the distance between center end 32 and way 23 is maintained at a constant by the hydraulic equilibrium condition. Furthermore, the combination of a hydrostatic bearing with a sliding pad type results in a composite having very desirable static and dynamic friction characteristics, i.e., the two parameters do not differ substantially.

In accordance with this invention therefor it should be apparent that an improved bearing obviating many problems of the prior art may be constructed.

What is claimed is:

1. A low-friction bearing for supporting a load for slidable movement along a load supporting surface, said bearing comprising:
   a wall defining a cylindrical housing, one end of said housing being open and the other end therefore being closed,
   a cylindrical center portion coaxially within said cylinder and terminating substantially flush with the open end of said cylindrical housing, said center portion defining with said wall an annular space,
   a ring piston mounted in sealed relation in said annular space for axial movement therein from a retracted position wholly within said annular space to an actuated position extending at least slightly beyond the open end of the cylinder, said ring piston having an endwise exposed outer surface portion thereof of a bearing material having a substantially lower coefficient of friction than such load supporting surface,
   means communicating said annular space between the piston and the closed end of the housing with a supply of fluid pressurized to a pressure sufficient to actuate the piston and elevate at least slightly a load supported on said supporting surface for slidable movement of the load along such supporting surface supported on said endwise outer surface portion of the piston.

2. The bearing of claim 1 wherein said surface portion of low friction bearing material comprises tetra-fluorethylene fluorocarbon resins.

3. The bearing of claim 1 wherein said means communicating said annular space with a supply of pressurized fluid comprises,
   a first passageway through said housing wall into said space between the piston and the closed end of the housing.

4. The bearing of claim 1 wherein said piston is provided with a first annular recess about its outer perimeter,
   a first flexible sealing means positioned in said first recess and extending about said piston to ensure a tight seal between said piston and said cylinder wall.

5. The bearing of claim 3 wherein said means for regulating the pressure of said pressurized fluid comprises;
   a second passageway extening through said raised center portion of said housing between said space within said cylinder between the piston and the closed end of the housing and the end of said raised center portion and hydraulically connecting same,
   a third passageway extending through said raised center portion and said housing between said end of said raised center portion and a return line for excess hydraulic fluid and hydraulically interconnecting same,
   said second and third passageways being spaced apart at said end of said raised center portion to form a channel between said latter passageways having a size dependent on the spacing of said end from a way when said bearing is positioned on said way,
   the pressure in said thereby being dependent on said spacing.

6. The bearing of claim 3 wherein said fluid is a liquid medium comprising lubricating oil.

7. The bearing of claim 4 wherein said first flexible sealing means comprises a rubber O-ring.

8. The bearing of claim 4 wherein said piston is further provided with a second annular recess about its inner perimeter,
   a second flexible sealing means positioned in said second recess and extending about said inner perimeter to ensure a tight seal between said piston and said cylinder wall.

9. The bearing of claim 6 said piston is provided with passages therethrough,
   said passages being arranged to communicate the end of the center portion with the exposed end of the piston, whereby lubricating oil is dispersed to said exposed end of the piston.

10. The bearing of claim 8 wherein said second flexible sealing means comprises a rubber O-ring.

References Cited

UNITED STATES PATENTS

| | | | |
|---|---|---|---|
| 2,748,578 | 6/1956 | Potts | 308—172 X |
| 2,826,277 | 3/1958 | Hawley | 92—107 X |
| 3,003,609 | 10/1961 | Lang | 192—107 X |
| 3,177,493 | 4/1965 | Durlofsky | 308—9 X |
| 3,179,018 | 4/1965 | Rumsey | 92—107 |
| 3,190,224 | 6/1965 | Billington | 92—107 X |
| 3,216,333 | 11/1965 | Thoma | 92—110 |
| 3,237,737 | 3/1966 | Mamo. | |
| 3,287,998 | 11/1966 | Goernert | 308—238 X |
| 3,391,965 | 7/1968 | Lineboom | 308—9 |

FOREIGN PATENTS

| | | |
|---|---|---|
| 847,092 | 8/1952 | Germany. |
| 110,581 | 1964 | Czechoslovakia. |

MANUEL A. ANTONAKAS, Primary Examiner

U.S. Cl. X.R.

92—107; 308—9